Patented Dec. 17, 1929

1,739,820

UNITED STATES PATENT OFFICE

LOUIS BENDA, OF MAINKUR, NEAR FRANKFORT-ON-THE-MAIN, AND OTTO SIEVERS, OF HOHE TANNE, NEAR HANAU-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR MANUFACTURING 4-HYDROXY-3-ACETAMINOARYL-1-ARSONIC ACID

No Drawing. Application filed July 16, 1926, Serial No. 123,006, and in Germany May 28, 1925.

Our invention has for its object a new process for manufacturing the therapeutically valuable 4-hydroxy-3-acetaminoaryl-1-arsonic acids by reducing the aryl-1-nitro-3-acetamino-4-hydroxycompounds and by converting the new monoacetyldiaminophenols thus obtained into the corresponding arsonic acids according to Bart's method.

The reaction, which takes place, and the products thus obtained may be illustrated by the following probable formulas:

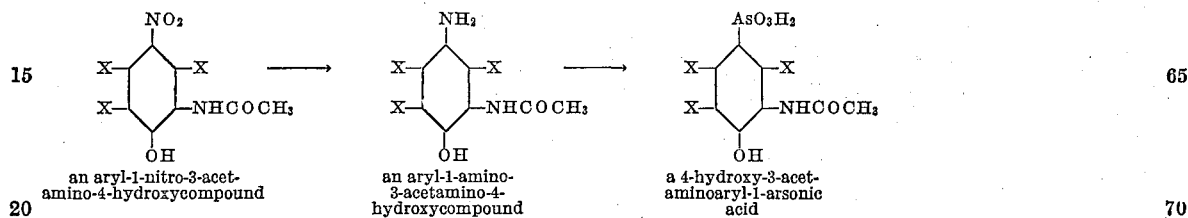

an aryl-1-nitro-3-acet-amino-4-hydroxycompound → an aryl-1-amino-3-acetamino-4-hydroxycompound → a 4-hydroxy-3-acetaminoaryl-1-arsonic acid In all these formulas the X's stand for hydrogen atoms, of which one or more may be replaced by a monovalent substituent.

It is surprizing that the reduction as well as the introduction of the arsonic acid residue takes place without any difficulty, a saponification being avoided.

Our new and simple process allows to produce the therapeutically valuable 4-hydroxy-3-acetaminoaryl-1-arsonic acids, which are partly known, in a pure state and with a good yield.

The intermediate products of the reaction, namely the aryl-1-amino-3-acetamino-4-hydroxycompounds have not been described hitherto in the literature. The free bases are very easily oxidized, their hydrochlorides are when dry almost colorless crystalline powders, easily soluble in water, alkalies and dilute acids and form diazocompounds which are capable of combining with azo components.

The following examples will further illustrate our new process and the products obtained by it. We wish it however to be understood that we are not limited to the particular conditions nor to the specific products mentioned therein. The parts are by weight and all temperatures in centigrade.

EXAMPLE 1

(a) 1-amino-3-acetylamino-4-phenol 90 parts of 1-nitro-3-acetamino-4-phenol are slowly introduced into a boiling suspension of 125 parts of iron filings in about 400 parts of water and 10 parts of glacial acetic acid. When the reduction is finished, the solution is neutralized with a solution of sodium carbonate in order to free it from iron and then it is filtered. By adding common salt and by carefully acidifying with hydrochloric acid the acetyldiamino-phenol hydrochloride is precipitated.

It forms feebly violet crystals, very easily soluble in water, dilute acids and alkalies. It yields a lemon-yellow diazo-solution, which combines with resorcinol to form a bluish red dyestuff and which combines slowly with R-salt to form a dull violet dyestuff.

(b) 4-hydroxy-3-acetylaminophenyl-1-arsonic acid

The aforesaid acetyldiaminophenol hydrochloride is treated by a procedure according to Bart's method, an example of which follows.

22 parts of the aforesaid acetyldiaminophenol hydrochloride are dissolved in 50 parts of water. Then 7 parts of hydrochloric acid ($d=1,15$) and 50 parts of ice are added and the solution is diazotized with a sufficient quantity of a solution of sodium nitrite. Then 32 parts of sodium arsenite are added while stirring well and the mass is neutralized until it reacts feebly alkaline by adding slowly about 25 parts of sodium carbonate. When the diazo solution is totally converted, the mass is acidified with about 48 parts of hydrochloric acid ($d=1,15$) and the precipitated arsonic acid is filtered after some time. It is purified by redissolving it in a solution of sodium acetate and precipitating with acids. Then it shows the properties of the known 4-hydroxy-3-acetylaminophenyl-1-arsonic acid.

EXAMPLE 2

(a) *5-chloro-1-amino-3-acetamino-4-phenol*

5-chloro-1-nitro-3-aminophenol, melting at 160° (see Annalen, vol. 109, page 291, and vol. 173, page 315) is acetylated in the usual manner, for example by means of acetic acid anhydride. The 5-chloro-1-nitro-3-acetamino-4-phenol forms almost white crystals, melting at 192–193°. It is easily soluble in the usual organic solvents, difficulty soluble in hot water and easy soluble in alkalies and alkali carbonates with a yellow color. It is reduced with iron and acetic acid. The reducing solution is filtered and acidified with hydrochloric acid. The 5-chloro-1-amino-3-acetamino-4-phenol hydrochloride, which is formed, is separated by adding common salt. When recrystallized from a small amount of water, it forms plane tables which melt at 222–224°. It is very easily soluble in water and yields a diazo compound which combines with resorcinol yielding a reddish dyestuff.

(b) *5-chloro-4-hydroxy-3-acetaminobenzene-1-arsonic acid*

160 parts of 5-chloro-1-amino-3-acetamino-4-phenol hydrochloride are dissolved in 115 parts of hydrochloric acid ($d=1,15$) and 2000 parts of ice water and then diazotized with a concentrated solution of the calculated quantity of sodium nitrite. The diazo solution is allowed to run into a mixture of 150 parts of sodium arsenite, 220 parts of sodium carbonate and 2000 parts of water, the temperature being advantageously maintained at 15–20° by exterior cooling. Then slowly about 400 parts of caustic soda solution (40° Bé.) are introduced. When the diazo compound has disappeared, the mass is feebly acidified, a salt solution is added until a concentration of about 24° Bé. is reached, and once more hydrochloric acid is added. The precipitated product is dissolved in a solution of sodium acetate, the filtered solution is precipitated with hydrochloric acid and finally the precipitate is recrystallized from water. It is identical with the product obtainable by acetylating 5-chloro-4-hydroxy-3-aminobenzene-1-arsonic acid.

EXAMPLE 3

(a) *5-methyl-1-amino-3-acetamino-4-phenol*

5-methyl-1-nitro-3-amino-4-phenol is acetylated in the usual manner, for example, by means of acetic acid anhydride. The acetyl compound forms feebly yellowish crystals which melt at 207–208°. It is difficultly soluble in cold water and easily soluble in hot water and in the usual organic solvents. It is reduced with iron and acetic acid. Common salt is added to the reducing solution until a concentration of about 24° Bé. is reached. The 5-methyl-1-amino-3-acetamino-4-phenol hydrochloride thus obtained forms almost colorless crystals, which are very easily soluble in water and which darken rapidly when exposed to the air.

(b) *5-methyl-4-hydroxy-3-acetaminobenzene-1-arsonic acid*

108,5 parts of 5-methyl-1-amino-3-acetamino-4-phenol are dissolved in 3000 parts of ice water and 115 parts of concentrated hydrochloric acid and diazotized with the calculated quantity of sodium nitrite. The diazo solution is allowed to run into a solution of 160 parts of sodium arsenite, 200 parts of sodium carbonate and 1600 parts of water at about 25° while stirring well. The reaction is finished by adding slowly 300 parts of caustic soda solution (40° Bé.). When the diazo compound has disappeared, the mass is feebly acidified by adding hydrochloric acid. Then it is filtered, more hydrochloric acid is added and then common salt is added. The precipitated product is purified by dissolving it in a dilute solution of sodium acetate, filtering and precipitating by acidifying the solution and finally by recrystallizing the precipitate from hot water. The new 5-methyl-4-hydroxy-3-acetaminobenzene-1-arsonic acid is when dry a colorless crystalline powder, soluble in hot water and alcohol, which precipitates from these solutions when they are cooled, and is insoluble in ether and benzene and easily soluble in solutions of sodium acetate, alkalies and alkali carbonates.

We claim:

1. A process for preparing 4-hydroxy-3-acetaminoaryl-1-arsonic acids of the probable formula:

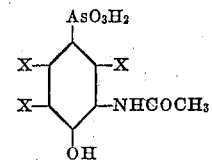

wherein the X's stand for hydrogen atoms, of which one or more may be replaced by a monovalent substituent, which comprises reducing the aryl-1-nitro-3-acetamino-4-hydroxy compounds of the formula:

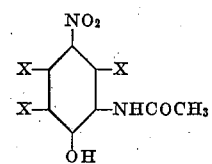

wherein the X's stand for hydrogen atoms, of which one or more may be replaced by a monovalent substituent, and diazotizing the resulting compounds and treating the diazo compounds thus obtained with an alkali-metal arsenite.

2. A process for preparig 4-hydroxy-3-acetamino-aryl-1-arsonic acids of the probable formula:

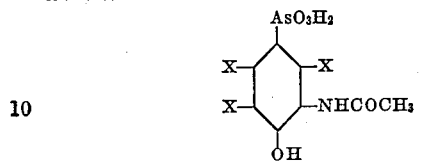

wherein the X's stand for hydrogen atoms, of which one or more may be replaced by a monovalent substituent, which comprises diazotizing aryl-1-amino-3-acetamino-4-hydroxy-compounds of the formula:

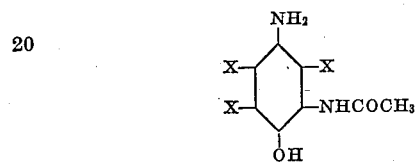

wherein the X's stand for hydrogen atoms, of which one or more may be replaced by a monovalent substituent, and treating the diazo compounds thus obtained with an alkali-metal arsenite.

3. In the process for preparing 4-hydroxy-3-acetaminoaryl-1-arsonic acids the step of preparing aryl-1-amino-3-acetamino-4-hydroxycompounds of the formula:

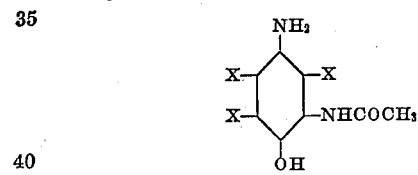

wherein the X's stand for hydrogen atoms, of which one or more may be replaced by a monovalent substituent, by reducing aryl-1-nitro-3-acetamino-4-hydroxycompounds of the formula:

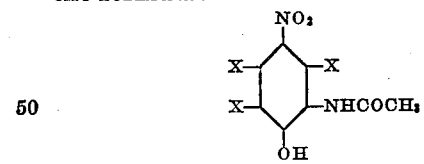

wherein the X's stand for hydrogen atoms, of which one or more may be replaced by a monovalent substituent.

4. A process for preparing 5-methyl-4-hydroxy-3-acetaminobenzene-1-arsonic acid of the probable formula:

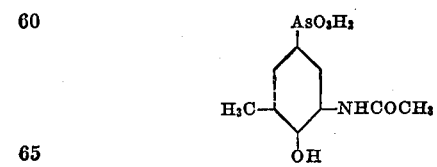

which comprises reducing 1-nitro-3-acetamino-5-methyl-4-phenol of the formula:

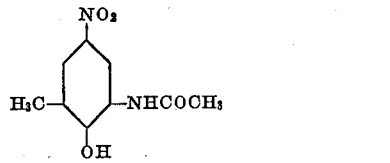

diazotizing the resulting compound and treating the diazo compound thus obtained with an arsenite.

5. As a new product, 5-methyl-4-hydroxy-3-acetaminobenzene-1-arsonic acid of the probable formula:

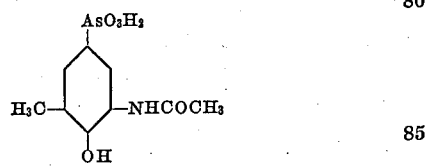

which is in the dry state a colorless crystalline powder, soluble in hot water and alcohol, precipitates from these solutions on cooling, is insoluble in ether and benzene, easily soluble in solutions of sodium acetate, alkalies and alkali carbonates and substantially identical with the product obtainable by reducing 1-nitro-3-acetamino-5-methyl-4-phenol of the formula:

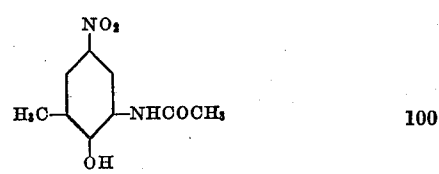

diazotizing the resulting compound and treating the diazo compound thus obtained with an arsenite.

In testimony whereof, we affix our signatures.

LOUIS BENDA.
OTTO SIEVERS.